United States Patent
Wetchler et al.

(10) Patent No.: US 6,389,167 B1
(45) Date of Patent: May 14, 2002

(54) MULTI-LEVEL PIXEL DENSITY REDUCTION FOR PRINTERS

(75) Inventors: David M. Wetchler, Vancouver; Joseph H. Bauman, Brush Prairie, both of WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/183,317

(22) Filed: Oct. 30, 1998

(51) Int. Cl.[7] ................................................. H04N 1/40
(52) U.S. Cl. ........................................ 382/199; 358/1.9
(58) Field of Search ......................... 382/199, 266–269; 358/1.9, 455–456, 458, 534

(56) References Cited

U.S. PATENT DOCUMENTS

| | | | |
|---|---|---|---|
| 4,586,835 A | 5/1986 | Alexander et al. | 400/121 |
| 5,051,844 A | 9/1991 | Sullivan | 358/456 |
| 5,070,413 A | 12/1991 | Sullivan et al. | 358/456 |
| 5,134,495 A | 7/1992 | Frazier et al. | 358/298 |
| 5,150,428 A | 9/1992 | Leone et al. | 382/50 |
| 5,150,429 A | 9/1992 | Miller et al. | 382/50 |
| 5,270,728 A | 12/1993 | Lund et al. | 346/1.1 |
| 5,289,564 A | 2/1994 | Morimoto et al. | 395/109 |
| 5,313,287 A | 5/1994 | Barton | 358/458 |
| 5,469,198 A | 11/1995 | Kadonaga | 347/41 |
| 5,502,792 A | 3/1996 | Chen et al. | 395/108 |
| 5,526,438 A | 6/1996 | Barton | 382/237 |
| 5,559,930 A | 9/1996 | Cariffe et al. | 395/102 |
| 5,574,832 A | 11/1996 | Towery et al. | 395/109 |
| 5,600,351 A | 2/1997 | Holstun et al. | 347/40 |
| 5,706,414 A | 1/1998 | Pritchard | 395/117 |
| 5,734,753 A | 3/1998 | Bunce | 382/237 |
| 5,761,325 A | 6/1998 | Barton | 382/100 |

FOREIGN PATENT DOCUMENTS

| | | | |
|---|---|---|---|
| EP | 0 513 989 A2 | 11/1992 | B41J/2/205 |
| JP | 1208155 | 8/1989 | B41J/3/12 |

*Primary Examiner*—Thomas D. Lee
*Assistant Examiner*—Stephen Brinich

(57) ABSTRACT

A method of reducing pixel density in pixel array printers, alternatively termed depletion, uses information about a pixel when it is first available instead of having to recalculate that information at a later time. According to embodiments of the present invention, the process of identifying edge pixels for the purpose of depletion is performed during a halftoning process, in which every pixel in a pixel data array is examined. Pixels are classified as one of four possible pixel states: a blank pixel, a left/right edge pixel, a top/bottom edge pixel, or an area-fill pixel. The pixel state information is stored in a modified pixel data area. A predetermined pattern of filled and unfilled smaller pixels is identified with each pixel state. Each element in the modified pixel data array is mapped onto the smaller pixels according to the predetermined pattern and a printer is controlled according to the resulting pattern.

21 Claims, 3 Drawing Sheets

MULTI-LEVEL PIXEL DENSITY REDUCTION FOR PRINTERS

BACKGROUND

1. Field of the Invention

This application relates generally to printers and more particularly to a method for reducing pixel density in pixel-array printers.

2. Description of the Related Art

Printing devices used to provide a hard copy version of images, text, or graphics (collectively images) produced in a computer system are almost exclusively binary in nature. Such devices include ink jet printers, dot matrix printers, laser printers, and thermal printers. After appropriate processing, the image to be printed is typically represented by a large two-dimensional array of uniformly spaced and sized pixels, in which each individual pixel is either "on" or "off". The printing device produces a mark on the output medium corresponding to each pixel that is marked "on." The intrinsic binary nature of the printed image becomes less obvious and the perceived image quality improves as the number of pixels per unit area increases.

Modem printers often include a provision for printing an image with reduced pixel density. The process of reducing the pixel density is alternatively referred to as dot depletion, particularly in the context of ink jet printing. The reduced pixel density corresponds to a draft mode or economy mode which advantageously uses less ink and also may provide faster throughput.

Depletion may also be employed to overcome problems associated with printing dense areas of an image. In areas of high density, the ink may not dry quickly enough, leading to smearing when two pages touch or when the user picks up the page. Also, in areas of high density, ink may be wasted as drops overlap each other. An equally dense image may be achieved with less ink and fewer drying problems. Finally, ink in high density areas may wick to lower density areas, degrading the image quality.

Furthermore, dot depletion techniques can also provide an enhanced mode of printing in which higher resolution data can be printed by a device designed for lower resolution than the data to be printed. These techniques are described, for example, in U.S. Pat. No. 5,574,832, which is commonly assigned with the present application and incorporated herein by reference.

Algorithms have been developed to determine which pixels to remove to achieve the benefits of depletion while maintaining print quality. These algorithms are typically executed on the array of pixels that is otherwise ready for printing. It would be desirable to provide a method of depletion that avoids having to execute additional time-intensive algorithms.

SUMMARY

A method of reducing pixel density in pixel array printers uses information about a pixel when it is first available instead of having to recalculate that information at a later time.

The method determines whether a pixel is located at an edge of a feature or at the center of a feature. In one embodiment, pixels located at an edge are printed in full, that is, all "on" pixels are left "on" while depletion is applied to central, alternatively termed "area-fill" pixels. Alternatively, edge depletion could be performed in which edge pixels are depleted and area-fill pixels are printed in full.

Image data to be printed in pixel array printers is typically available in computer memory in a continuous color scale version (RGB data) suitable for display on computer monitors. To print on a binary printing device, this version has to be converted to a binary version of the image. The conversion methods are commonly referred to as halftoning.

According to embodiments of the present invention, the process of identifying edge pixels for the purpose of depletion is performed during the halftoning process, in which every pixel in a pixel data array is examined. Pixels are identified with one of four possible pixel states: a blank pixel, a left/right edge pixel, a top/bottom edge pixel, or an area-fill pixel. The pixel state information is stored in a modified pixel data area. A predetermined pattern of filled and unfilled smaller pixels is identified with each pixel state. In one embodiment, the predetermined pattern corresponds to all filled smaller pixels for the edge pixel state and a pattern of filled and unfilled smaller pixels for the area-fill pixel state. In this way, the portions of the pixel array corresponding to area fill pixels are depleted. Each element in the modified pixel data array is mapped onto the smaller pixels according to the predetermined pattern and a printer is controlled according to the resulting pattern.

According to other embodiments of the present invention, edge identification for the purpose of depletion is combined with algorithms, other than halftoning algorithms, such as compression or black fortification algorithms, that process every element of a pixel data array.

BRIEF DESCRIPTION OF THE DRAWINGS

The use of the same reference symbols in different drawings indicates similar or identical items.

DESCRIPTION OF THE PREFERRED EMBODIMENTS

A method of reducing pixel density in pixel array printers uses information about a pixel when it is first available instead of having to recalculate that information at a later time.

Figure 1:
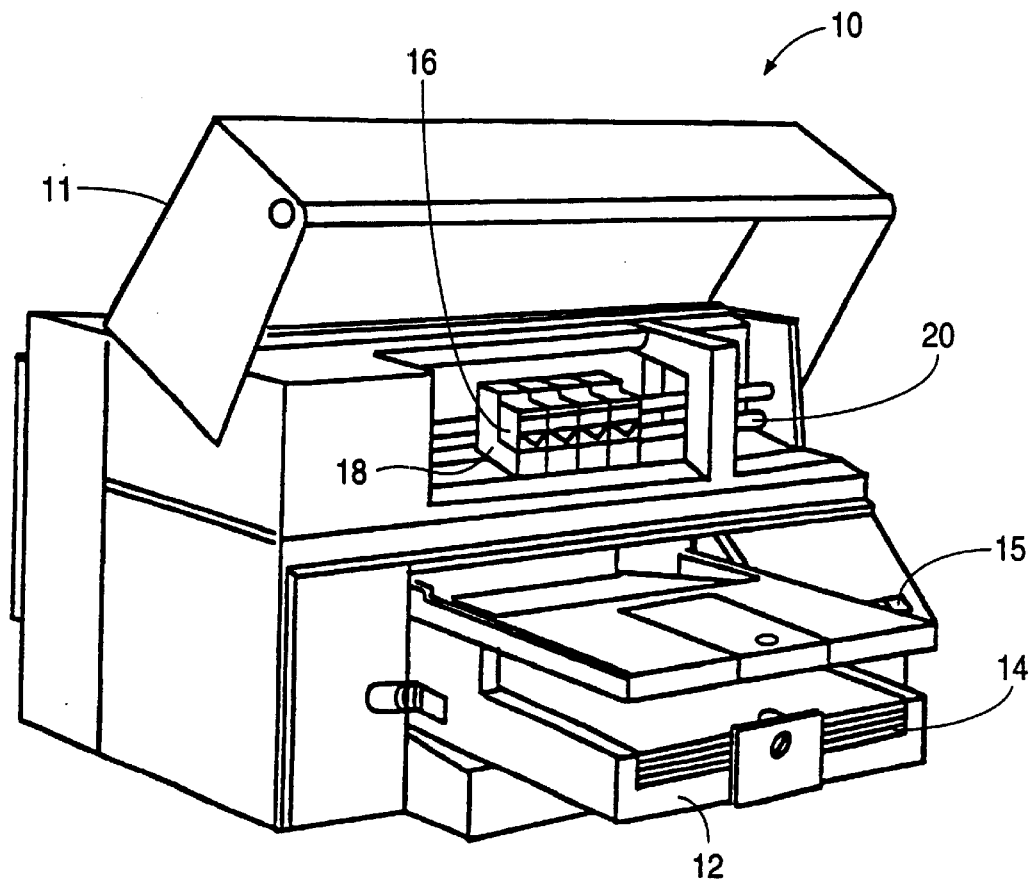
FIG. 1 illustrates a color ink jet printer which can print arrays depleted according to embodiments of the present invention.

The method can be applied, for example, with respect to printing with color inkjet printer 10, illustrated in FIG. 1. The color inkjet printer includes a cover 11, a paper tray 12 for holding virgin paper 14, an output tray 15 for receiving the printed pages, color print cartridges 16, and a scanning carriage 18 for sliding along a slide bar 20 while dots are being printed on the paper. The color print cartridges 16 may include cyan (C), magenta (M), yellow (Y), and black (K) ink print cartridges.

Figure 2:
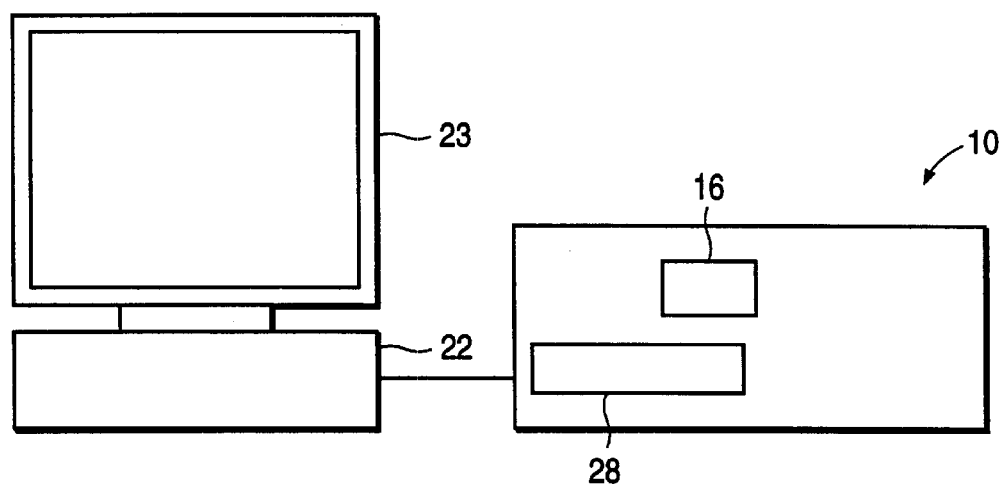
FIG. 2 illustrates a computer connected to an inkjet printer, where the computer and the printer both can carry out steps in a depletion method according to embodiments of the present invention.

FIG. 2 is a schematic diagram of a printing system which includes a host computer 22, a monitor 23 (e.g., a CRT), and printer 10. Printer 10 also includes a printer controller 28 for controlling the printing of dots by print cartridges 16. The print cartridges may print at 300 dots-per-inch (DPI), 600 DPI, or any other resolution.

Figure 3:
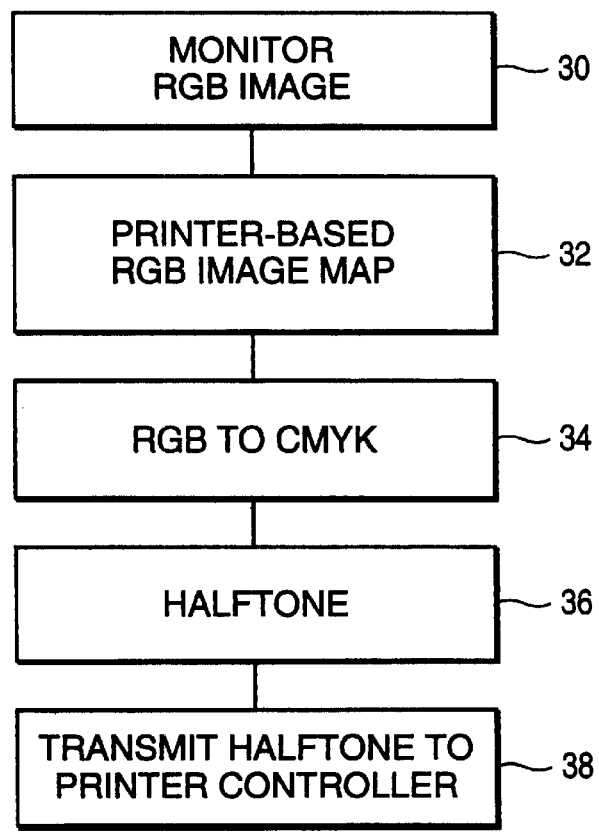
FIG. 3 illustrates a general method performed by the computer and printer of FIG. 2.

FIG. 3 illustrates the standard flow of image information from computer 22 to printer 10. An image is first created or introduced into the memory of computer 22. The image may be generated for example by a scanner, by graphics software, or by a word processing program that uses a graphic (rather than a character) mode of output. In order to be displayed on the computer monitor 23, this image is represented in additive RGB color space. Each pixel location on the screen can be illuminated in red, green, and blue at any one of 256 (0 to 255) levels of intensity. It takes 8 bits to represent 256 levels ($2^8$=256). Each of the three primary colors requires 8 bits; therefore, RGB color monitors are commonly referred to as producing 24-bit color (3 ×8=24). This image is represented at the spatial resolution of the particular monitor. Typical monitors have 75 pixels per linear inch (75 DPI) in the vertical and horizontal directions.

At step 30, the 24-bit RGB color image is held in the memory of computer 22 so that it can be displayed on monitor 23.

At step 32, the image in memory is converted to a 24-bit ROB image at the resolution of the printer. Typical inkjet printers have a resolution of 300, 600, 1200 or 1400 dots per inch.

At step 34, the printer RGB color image is converted into CMYK subtractive color space using, for example, a conventional lookup table.

In step 36, the CMYK image is halftoned to convert the image from 4-plane (CMYK), 8-bits per color to 4-plane binary color ("on" or "off" dots) at the DPI resolution of the printer. In other words, the color and intensity (0–255) at each pixel location is converted into a pattern of "on" or "off" C, M, Y, or K dots (255 or 0 intensity) to be printed. This halftoned image is stored in a memory. The halftoned image is sent to printer controller at step 38.

A good general reference for halftoning methods is Digital Halftoning, by Robert Ulichney, The MIT Press, 1987, which is incorporated herein by reference. One example of a particular halftoning approach that may be used for color inkjet printing is described in the U.S. Pat. No. 5,949,965, entitled Correlating Cyan and Magenta Planes for Error Diffusion Halftoning, to Gandet issued Sep. 7, 1990, which is assigned to the present assignee and incorporated herein by reference. Another example of a halftoning method is given in U.S. Pat. No. 5,313,287 to David Barton, which is assigned to the present assignee and incorporated herein by reference. Yet another example is provided by U.S. Pat. No. 5,070,413 to James Sullivan et al., which is incorporated herein by reference.

In a typical implementation, the halftoned image is represented as four binary, or bit map, arrays, one array for each color. For example, each one-bit element of array C(x) indicates whether or not a cyan dot is to be printed at pixel location x.

Figure 4:
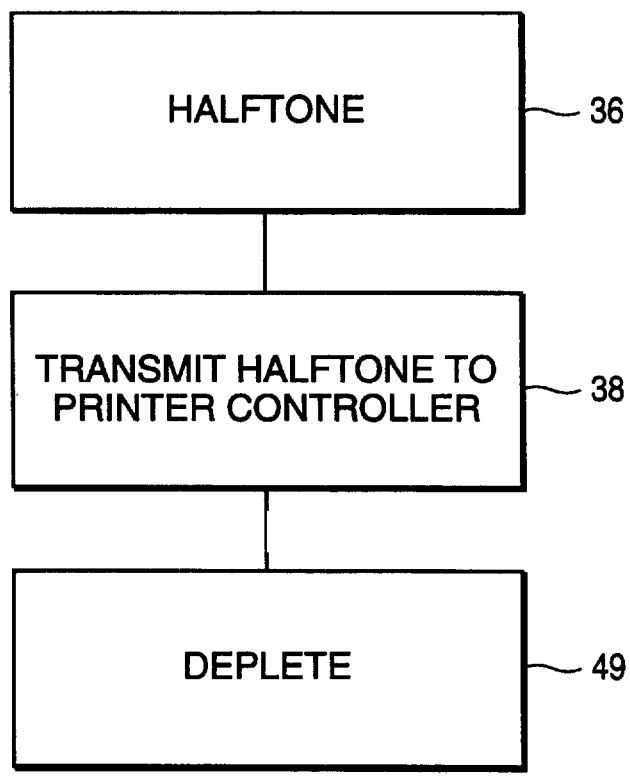
FIG. 4 is a flow chart of a depletion method of the prior art.

In the prior art, when dot depletion is to be implemented, each pixel array of the halftoned image is processed to produce a modified pixel array with reduced pixel density. Typically, depletion, step 49 in FIG. 4, is performed in the printer controller 28 after the halftoned image has been transmitted to the printer controller. In the prior art, depletion requires a separate processing step, 49, in addition to the halftoning processing step, 36.

According to an embodiment of the present invention a depletion method includes determining whether a pixel is located at an edge of a feature or within the edges of a feature. In one embodiment, pixels located at an edge are printed in full, that is, all "on" pixels are left "on" while depletion is applied to pixels within the edges, alternatively termed "area-fill" pixels. This arrangement tends to achieve the benefits of depletion while visually defining the feature to create a visually pleasing image. Alternatively, edge depletion could be performed in which edge pixels are depleted and area-fill pixels are printed in full, depending on the visual effect desired.

Edge pixels are defined as follows: The pixels are assumed to constitute a rectangular grid with rows, alternatively termed rasters, extending horizontally and columns extending vertically. A blank is defined as having no "on" pixel of any color. That is, for full color intensity defined as value 255, a blank pixel is defined as a pixel having a color intensity value less than a certain threshold for all colors: C, M, Y, and K. An edge pixel is defined as a pixel which has any horizontal or vertical neighbor which is blank.

Figure 5:
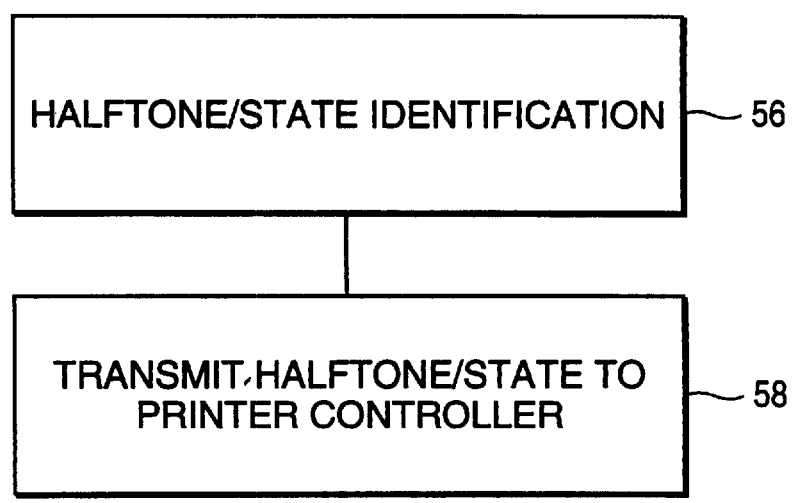
FIG. 5 is a flow chart of a depletion method according to embodiments of the present invention.

According to an embodiment of the present invention, the determination of whether a pixel is an edge pixel or an area-fill pixel is made during halftoning processing and stored along with the pixel state information. Assume the pixels are processed for halftoning across rows from left to right. The pixel being processed is termed the current pixel. While halftoning proceeds, an additional step is included in which the previous pixel in the same row and the next pixel in the same row are examined. If either of these neighboring pixels is blank, the current pixel is classified as a left/right edge. The pixel directly above the current pixel, in the previous row and the pixel directly below the current pixel, in the next row, are also examined. If either of these neighbors is blank, the current pixel is classified as a top/bottom edge. The edge determining process is expressed in the following pseudo code with the definitions given immediately below:

Definitions
    current_pixel—the current pixel we are looking at, represented as
    32 bits, 8 bits per CMYK
    primitive_to_fire—the primitive of a particular color CMYK
    pixel_size=4 (4bytes=32 bits)
    raster_size—the number of pixels in one raster
    position—a pointer to the current pixel
    previous pixel_position–pixel_size
    next_pixel=position+pixel_size
    previous_row_pixel=position–(raster_size*pixel_size)
    next_row_pixel=position+(raster_size*pixel_size)
Algorithm
    if the current_Pixel will cause a primitive to fire then
        if the previous_pixel=blank or next_pixel=blank
            then set the state to left_right_edge
        else if the previous_row_pixel is blank or the next_row_pixel is blank
            then set the state to top_bottom_edge
        else set the state to fill_area
    primitive_to_fire=state The halftoning/edge identification process is shown as step 56 in FIG. 5. The input to step 56 is the output of step 34 shown in FIG. 3. Step 56 approximately takes the place of halftoning step 36 and depletion step 49 in the prior art depletion process shown in FIG. 4. According to an embodiment of the present invention, the output of the halftoning/ edge identification process is stored in modified arrays, represented, for example, as CL(x) and the corresponding arrays for the other colors, in which each pixel location is represented by 2 bits. The 2-bit representation can be used to indicate the four pixel states shown below in Table 1. Note that each pixel in the 32 bit CMYK array is only processed once. The edge determination and the halftone conversion from continuous color scale to binary color is done at the same time and stored in the modified arrays.

TABLE 1

Pixel State and Pixel Mapping

| Representation | Description | 4 Pixel Pattern |
|---|---|---|
| 00 | blank | |
| 01 | left/right edge | ●   ● <br> ●   ● |
| 10 | top/bottom edge | ●   ● <br> ●   ● |
| 11 | area-fill | ●     <br>     ● |

In one embodiment, the halftoned and edge-identified image is stored in memory and transmitted to the printer at step 58. In a preferred embodiment, the arrays containing this image are compressed, using conventional techniques, prior to being transmitted to the printer. In the printer, the arrays are decoded and the array elements are transformed according to a predetermined pixel mapping depletion pattern. One example of such a pixel mapping is given in the last columns of Table 1. In this example, each pixel is mapped into four pixels, each half the linear size of the original pixel. For example, if the array CL(x) corresponds to a printer resolution used in the conversion in step 36 of 300 dots per inch, each pixel in CL(x) is mapped to four smaller pixels, corresponding to a resolution of 600 dots per inch. The printer controller 28 controls the print cartridges 16 according to the mapped array elements, as conventionally done for printing at the higher resolution. The pixel mapping and print cartridge controlling can be carried out in the printer controller using a custom digital application specific integrated circuit (ASIC).

As shown in Table 1, for each pixel identified as an edge pixel, all four smaller pixels are filled. The pixels identified as area-fill pixels are depleted. Only two of the four possible pixel positions are filled, the upper right and lower left. Alternatively, the area-fill pixel pattern could have the opposite corner positions filled, that is the upper left and lower right positions could be filled. In another implementation, the two area-fill patterns could be used alternately. Additional variations on mapping patterns might alternatively be employed. In certain embodiments, it might be desirable to distinguish between left/right edge and top/bottom edge. In mechanical printers, for example, to achieve fast printing speed, it might be advantageous to deplete the top or bottom edge. Alternatively, mapping patterns in which an original pixel is transformed into a larger number of smaller pixels, such as into 9 or 16 smaller pixels, or into rectangular rather than square arrangements of smaller pixels can be used.

In the embodiment illustrated in FIG. 5, the halftoning/edge identification process is performed in the host computer 22, while the dot mapping is performed by the printer controller 28 prior to controlling print cartridges 16. In an alternative embodiment, the CMYK image, that is the output of step 34 is transmitted to the printer controller and the halftone/edge identification, pixel mapping, and print cartridge controlling processes are all carried out in the printer controller. These processes are advantageously implemented using a digital ASIC. In yet another alternative, the dot mapping can be performed in the host computer to produce further modified pixel arrays corresponding to the higher resolution, i.e., in the present example, corresponding to 600 dots per inch, which are then transmitted to printer controller 28. In this case, the modified arrays are used directly to control print cartridges 16.

In alternative embodiments of the present invention, edge identification could be combined with algorithms, other than halftoning algorithms, that process each pixel of a pixel data array. It is particularly advantageous to combine edge identification with algorithms that, in processing a particular pixel, interrogate adjacent pixels. For example, edge identification could be incorporated as an additional step in a compression algorithm. In one implementation, a halftoned array is processed by a compression algorithm modified to include edge identification. During this process, each one bit array element of the halftoned array is replaced by a two bit array element incorporating edge information, and the result compressed. A second example of an algorithm that processes each pixel of a pixel data array is black fortification, that is the process of modifying black areas of an image to take into account how adjacent black and colored pixels interact with each other.

While embodiments of the present invention have been explained above with specific reference to reducing pixel density in an ink jet printer with four cartridges, it will be readily apparent to those skilled in the art that the depletion techniques are applicable to any printing device that uses binary pixel arrays. Application to monochrome data which is output to monochrome printing devices, where, at all steps, the data is expressed in a single array, is straightforward. All such applications and modifications are, therefore, within the spirit and scope of the invention as defined by the following claims.

What is claimed is:

1. A method for depleting pixels in a generally rectilinear pixel data array comprising first pixels, the method comprising:

identifying a halftoning pixel state with each first pixel while performing a halftoning algorithm in a processor, said algorithm processing each pixel in said pixel data array, and pixel states being classified as one of the following: a blank pixel, a left/right edge pixel, a top/bottom edge pixel, or an area-fill pixel, wherein each pixel state is associated with a predetermined depletion pattern of second pixels; and using said halftoning pixel state to transform each said first pixel into a pattern of said second pixels, according to said predetermined depletion pattern, to produce depleted pixels.

2. The method of claim 1 wherein said second pixels are smaller than said first pixels.

3. The method of claim 2 wherein each first pixel corresponds to a first resolution and each second pixel corresponds to a resolution of at least twice said first resolution.

4. The method of claim 1 wherein said predetermined depletion pattern for pixel state area-fill pixel comprises filled and unfilled second pixels.

5. The method of claim 1 wherein said predetermined depletion pattern for pixel state left/right edge pixel and pixel state top/bottom edge pixel includes only filled second pixels.

6. The method of claim 1 wherein said predetermined depletion pattern for pixel state left/right edge pixel and pixel state top/bottom edge pixel comprises filled and unfilled second pixels.

7. The method of claim 1 wherein said predetermined depletion pattern for pixel state area-fill pixel includes only filled second pixels.

8. The method of claim 1 further comprising storing said halftoning pixel state for each first pixel in a modified pixel data array.

9. The method of claim 8 wherein each element in the modified pixel data array comprises two bits.

10. The method of claim 9 further comprising compressing said modified pixel data array.

11. The method of claim 1 wherein said generally rectilinear data array comprises rows and columns of said first pixels and wherein identifying a halftoning pixel state with each first pixel comprises comparing each first pixel with adjacent first pixels in the same row and with adjacent first pixels in the same column.

12. A method for controlling a printer to print depleted pixel arrays comprising:

forming a generally rectilinear pixel data array comprising first pixels;

identifying a halftoning pixel state with each first pixel in the pixel data array while performing a halftoning process on the array in a processor, pixel states being classified as one of the following: a blank pixel, a left/right edge pixel, a top/bottom edge pixel, or an area-fill pixel;

storing said halftoning pixel state for each first pixel in a modified pixel data array;

associating each pixel in said modified pixel data array with a pattern of filled and unfilled second pixels according to a predetermined depletion pattern and said halftoning pixel state; and controlling said printer according to said pattern of second pixels.

13. The method of claim 12 wherein each first pixel corresponds to a first resolution and each second pixel corresponds to a resolution of at least twice said first resolution.

14. The method of claim 12 wherein said predetermined depletion pattern for pixel state area-fill pixel comprises filled and unfilled second pixels.

15. The method of claim 12 wherein said predetermined depletion pattern for pixel state left/right edge pixel and pixel state top/bottom edge pixel includes only filled second pixels.

16. The method of claim 12 wherein said predetermined depletion pattern for pixel state left/right edge pixel and pixel state top/bottom edge pixel comprises filled and unfilled second pixels.

17. The method of claim 12 wherein said predetermined depletion pattern for pixel state area-fill pixel includes only filled second pixels.

18. The method of claim 12 wherein each element in the modified pixel data array comprises two bits.

19. The method of claim 18 further comprising compressing said modified pixel data array.

20. The method of claim 12 wherein said generally rectilinear data array comprises rows and columns and wherein identifying a halftoning pixel state with each first pixel comprises comparing each first pixel with adjacent first pixels in the same row and with adjacent first pixels in the same column.

21. The method of claim 12 wherein said processor is in said printer.

* * * * *